(12) United States Patent
De Pelsemaeker et al.

(10) Patent No.: US 12,296,644 B2
(45) Date of Patent: May 13, 2025

(54) METHOD FOR CONTROLLING THE TEMPERATURE OF A HEATING SURFACE OF A HEATING PANEL AND CORRESPONDING CONTROL DEVICE

(71) Applicant: Valeo Systemes Thermiques, Le Mesnil Saint Denis (FR)

(72) Inventors: Georges De Pelsemaeker, Le Mesnil Saint Denis (FR); Mohamed-Amine Boubaker, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 1017 days.

(21) Appl. No.: 17/058,360

(22) PCT Filed: Jun. 11, 2019

(86) PCT No.: PCT/FR2019/051403
§ 371 (c)(1),
(2) Date: Nov. 24, 2020

(87) PCT Pub. No.: WO2019/243709
PCT Pub. Date: Dec. 26, 2019

(65) Prior Publication Data
US 2021/0229522 A1    Jul. 29, 2021

(30) Foreign Application Priority Data
Jun. 21, 2018    (FR) ...................... 1855495

(51) Int. Cl.
*B60H 1/00*    (2006.01)
*B60H 1/22*    (2006.01)
*H05B 3/20*    (2006.01)

(52) U.S. Cl.
CPC ....... *B60H 1/00742* (2013.01); *B60H 1/2227* (2019.05); *B60H 1/00878* (2013.01);
(Continued)

(58) Field of Classification Search
CPC .............. B60H 1/00742; B60H 1/2227; B60H 1/00878; B60H 2001/2265; H05B 3/20; H05B 3/0236; H05B 2203/032
(Continued)

(56) References Cited

U.S. PATENT DOCUMENTS 11,059,349 B2 *   7/2021   Prakah-Asante .. B60H 1/00807
2010/0187211 A1   7/2010   Eisenhour et al.
(Continued)

FOREIGN PATENT DOCUMENTS

DE    10256698 A1 *   6/2003   ......... B60H 1/00285
DE    112015000847 T5 *   11/2016   ............... B60H 1/22
(Continued)

OTHER PUBLICATIONS

Notification of Reason for Rejection in corresponding Japanese Application No. 2020-570816, dated Feb. 15, 2022 (8 pages).
(Continued)

*Primary Examiner* — Jeffrey T Carley
*Assistant Examiner* — Alba T Rosario-Aponte
(74) *Attorney, Agent, or Firm* — Osha Bergman Watanabe & Burton LLP

(57) ABSTRACT

A method (7) for controlling the temperature of a heating surface (5) of a heating panel (1) suitable for being installed inside a passenger compartment of a vehicle, for example a motor vehicle, this surface (5) being likely to be touched by a passenger in said passenger compartment, the method (7) involving controlling the temperature of said heating surface (5) as a function of at least one item of data representative of the profile of a passenger accommodated in the passenger compartment and/or at least one item of data representative of the heating surface (5) of the heating panel (1). The invention also relates to a corresponding control device (15).

9 Claims, 3 Drawing Sheets

Figure 1:
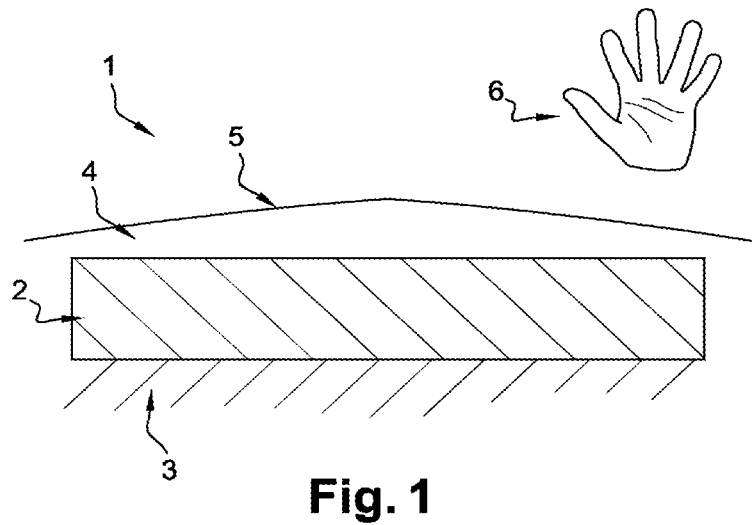

(52) U.S. Cl.
CPC ........ *B60H 2001/2265* (2013.01); *H05B 3/20* (2013.01); *H05B 2203/032* (2013.01)

(58) Field of Classification Search
USPC ........................................................ 219/202
See application file for complete search history.

(56) References Cited

U.S. PATENT DOCUMENTS

| | | |
|---|---|---|
| 2014/0246415 A1 | 9/2014 | Wittkowski |
| 2016/0001632 A1 | 1/2016 | Song et al. |
| 2017/0282685 A1 | 10/2017 | Bader et al. |

FOREIGN PATENT DOCUMENTS

| | | | | |
|---|---|---|---|---|
| EP | 2517907 A2 | | 10/2012 | |
| JP | 2012192827 A | * | 10/2012 | ........... B60H 1/2218 |
| WO | 2015097218 A1 | | 7/2015 | |

OTHER PUBLICATIONS

International Search Report and Written Opinion corresponding to International Application No. PCT/FR2019/051403, mailed Jun. 11, 2019 (11 pages).

* cited by examiner

METHOD FOR CONTROLLING THE TEMPERATURE OF A HEATING SURFACE OF A HEATING PANEL AND CORRESPONDING CONTROL DEVICE

The field of the present invention relates to devices for heating a passenger compartment of a vehicle, for example a motor vehicle, and more particularly to heating panels arranged inside such a passenger compartment. The invention relates to a method for controlling the temperature of a heating surface of a heating panel. The invention also relates to a device for controlling the temperature of a heating surface of such a heating panel.

Most vehicles are provided with a system for heating air to be sent into the passenger compartment. This heating system can be supplemented by one or more heating panels, i.e. surfaces that warm the passengers by infrared radiation while heating the air situated inside the passenger compartment by convection. The current heating panels have shapes and/or dimensions adapted to their location in the passenger compartment of the vehicle into which they are to be incorporated. By way of non-limiting illustrative examples, the heating zones can be: a seat, the dashboard, the roof, a pillar, a door and/or a footwell.

The current heating panels must ensure the comfort and safety of the users of the vehicle, the aim being to provide a pleasant, safe driving experience. In order to meet these demands, it is known practise to optimize the design of the heating panels and to set their heating temperature limit. However, a design imposed on a heating panel limits its incorporation into a given part of the passenger compartment. In addition, imposing a heating temperature limit does not take into account the personal characteristics of the passenger, in particular their sensitivity to heat.

It is known from US20140246415 that a heating element, suitable for being installed in the seat of a vehicle, can be produced from a textile material into which electrically conductive copper or carbon fiber threads are incorporated. However, there is a risk that such a heating element will harm the passengers due to its relative fragility (carbon fibers tend to break easily). In order to overcome this drawback, an improved design of the heating textile material is proposed, allowing it to be incorporated easily into a vehicle seat, without exposing users to the aforementioned risk. However, no proposal is made to control the temperature limit of the textile heating surface, taking into account individual parameters.

WO2015097218 relates to a heating device with an adjustable, uniform distribution temperature that makes it possible to overcome certain shape and size constraints (in particular due to the non-flatness of the surfaces receiving the device). This document thus mentions some of the background referred to in US20140246415, but does not propose personalizing the temperature management inside the passenger compartment, ensuring both safety and comfort for the user.

None of the documents cited thus envisages taking into account user data and data relating to the material forming the heating surface for controlling the heating temperature limit of the heating panel.

The invention relates to a method for controlling the temperature of a heating surface of a heating panel suitable for being installed inside a passenger compartment of a vehicle, for example a motor vehicle, this surface being likely to be touched by a passenger in said passenger compartment, the method comprising the following step:

controlling the temperature of said heating surface as a function of at least one item of data representative of the profile of a passenger accommodated in the passenger compartment and/or at least one item of data representative of the heating surface of the heating panel.

The invention therefore proposes taking into account both the passenger profile (physiological parameters, state of health, occupational category, etc.) and the type of heating surface (textile, material compatible with the passenger compartment, etc.) when controlling the temperature of a heating surface of a heating panel suitable for being installed inside a vehicle passenger compartment.

The proposed invention makes it possible to meet growing needs relating to safety on board a vehicle, in particular by minimizing the risks of burns to the body (the most exposed parts of the body being the hands and arms) and damage to the material on contact with the heating surface (clothing, personal accessories).

Another aim of the present invention is to minimize the sensation of discomfort felt by individuals who are intolerant to heat, in particular those who suffer from skin allergies and/or excessive perspiration (local or general).

It must be noted that a vehicle passenger compartment is defined as part of the vehicle in which the users of the vehicle, such as the driver and passengers, are accommodated. The heating panel(s) is/are arranged inside the passenger compartment in one or more separate zones of the vehicle. By way of illustrative, non-limiting examples, the heating panel can be situated in: the roof, a pillar, the dashboard, a door, a footwell and/or a seat. The shape and dimensions of the heating panel(s) are adapted to each type of use and are not limiting criteria of the present invention.

The heating surface of a heating panel is one of the visible parts of the heating panel. It is therefore likely to be touched, intentionally or unintentionally, by at least one of the passengers of the vehicle. It can have a function of protecting the heating elements of the heating panel by electrically insulating them and/or protecting them from any physical and/or chemical aggression that might originate from the passenger compartment. It can also act as trim on the part of the heating panel generating thermal heating. It therefore plays a decorative role by making the heating panel aesthetic.

The method for controlling the temperature of a heating surface of a heating panel can take into account at least one item of data representative of the profile of a passenger accommodated in the passenger compartment, namely:

a physiological characteristic of the passenger: their metabolic activity, age, sex, weight, skin color, etc.

a state of health of the passenger: their hydration level, wakefulness, etc.

an item of information about the passenger's lifestyle: their occupational category, a hobby, their country of origin, etc.

the sensitivity of a part of the body likely to come into contact with the heating surface, in particular the sensitivity of a hand, arm and/or foot.

According to one aspect of the invention, the passenger compartment of the vehicle comprises at least one sensor arranged to measure a parameter used to determine at least one of the items of data representative of the profile of a passenger accommodated in the passenger compartment.

According to one aspect of the invention, the sensor is chosen from:

a front camera, in particular a DMS camera, arranged to observe a passenger in the passenger compartment, a physiological data sensor, a dome made up for example of a 3D camera and an infrared camera, a high-frequency radar that makes it possible to know how many people are present and their physiological state and current activity, including the positioning of their body.

According to one aspect of the invention, the method for controlling the temperature of a heating surface of a heating panel further comprises a step of determining the maximum temperature tolerated by a passenger in the vehicle, said maximum tolerated temperature being determined on the basis of at least one item of data representative of the profile of said passenger.

The maximum tolerated temperature depends on the individual characteristics. The method for controlling the temperature of the heating surface including a step of determining the maximum temperature tolerated by a passenger therefore adapts to the specific profile of each passenger.

It is generally possible to classify passengers according to their sensitivity to heat. A distinction is made between:

the reference class, in which the subjects tolerate a maximum temperature of 50° C., or those for whom no representative data is available.

class A, in which the subjects tolerate a maximum temperature of 60° C., in particular subjects regularly exposed to high temperatures.

class B, in which the subjects tolerate a maximum temperature of 45° C., in particular subjects who have higher than average sensitivity to high temperatures (elderly people, etc.).

class C, in which the subjects tolerate a maximum temperature of 40° C., in particular vulnerable subjects (children, babies, etc.).

According to one aspect of the invention, the maximum temperature tolerated by the passenger depends on the conditions prevailing inside the passenger compartment, in particular the ventilation temperature, the temperature in the passenger compartment, and/or the humidity level.

According to one aspect of the invention, the temperature of the heating surface is lower than the maximum temperature tolerated by the passenger when part of the passenger's body comes into contact with the heating surface. The advantage is that of ensuring that the heating surface of the heating panel is not hot to the extent that it will burn the passenger in the event of accidental or intentional body contact. The safety on board the vehicle is therefore optimized by taking into account the heat tolerance threshold, which is a parameter specific to each individual.

In order to monitor the satisfactory implementation of the method, the temperature of the heating surface of the heating panel can be measured over time by a temperature sensor and/or an infrared camera. The temperature can also be estimated by performing an energy audit the input data of which is the electric power transmitted to the heating panel and also the environmental data that enables the use of the laws of heat transfer.

According to one aspect of the invention, the method for controlling the temperature of a heating surface of a heating panel can take into account at least one item of data representative of the heating surface of the heating panel, namely:

the type of material forming the heating surface: leather, wood, fabric, paint, lacquer, metal, plastic, or any other material enabling the aesthetic anchoring of the heating panel in the passenger compartment, the surface finish of the material forming the heating surface: roughness, porosity, form of irregularities (line, spacing, etc.), a thermal parameter specific to the material: effusivity, thermal conductivity, thermal capacity, density, etc.

According to one aspect of the invention, the passenger compartment of the vehicle comprises at least one sensor arranged to measure a parameter used to determine at least one of the items of data representative of the heating surface of the heating panel. The sensor is selected from:

an infrared camera installed so that it observes the radiating surface, a local temperature sensor, a numerical evaluation of the contact temperature produced by a thermal calculation incorporating data representative of the environment and the electric power of the panels, a temperature sensor measuring the temperature of the air near the panel.

The thermal effusivity of a material is a particularly useful quantity for characterizing the thermal inertia of a material. It determines the rate at which it can change temperature when the surface of the material is placed in contact with the surface of another material. Taking the thermal effusivity parameter into account when controlling the temperature of the heating surface of the heating panel makes it possible to incorporate the sensory perception of said heating surface when it comes into contact with the skin of a passenger in the vehicle. Thermal effusivity depends on the type of material and can be corrected, in a refined model, by a factor taking into account the surface finish of the material (roughness, porosity, etc.). The effusivity thus calculated, which depends on both the type of material and its surface finish, is known as the corrected effusivity.

According to one aspect of the invention, the method further comprises a step of determining the dry bulb temperature of the heating surface, known as the maximum permissible temperature of said heating surface. The dry bulb temperature is calculated in particular on the basis of the maximum temperature tolerated by the passenger and at least one item of data representative of said heating surface.

According to one aspect of the invention, the item of data representative of the heating surface of the heating panel is the effusivity of the material forming said heating surface, the material being selected from: leather, wood, fabric, paint, lacquer, metal, plastic or any other material enabling the aesthetic anchoring of the heating panel in the passenger compartment.

According to another aspect of the invention, the effusivity of the material is corrected by a factor taking into account the surface finish of said material (roughness and/or porosity, irregularity or continuity). In particular, the roughness, Ra (average roughness), can be less than 10 µm (for example if the surface is smooth), and conversely it can be greater than 70 µm (for example if the surface is structured).

The dry bulb temperature of the heating surface is the temperature of said heating surface before contact with a passenger (passenger characterized by at least one item of data representative of their profile and/or class). The dry bulb temperature value depends on the material (type, surface finish). It is controlled as a function of the maximum temperature tolerated by the passenger, which depends on at least one item of data representative of the passenger's profile. The determination of the dry bulb temperature of the heating surface is therefore optimized as a function of the profile of the passenger likely to touch the heating surface.

By default, if no item of data representative of the passenger's profile is available, the maximum temperature tolerated by the passenger is taken as equal to 50° C. The passenger is therefore considered to belong arbitrarily to the reference class defined above.

In order to meet the conditions for controlling the temperature of a heating surface of a heating panel, the dry bulb temperature of the heating surface must thus have a value such that on contact between the skin of a passenger and said heating surface, the temperature of the heating surface must not exceed the maximum temperature tolerated by that passenger. Under these conditions, the risk of burns is low.

According to one embodiment, it is envisaged that the contact time will be taken into account, that is, the time for which the skin is in contact with the heating surface.

According to one aspect of the invention, said method further comprises a step of acquiring at least one item of time information ($t_c$) relating to the contact time between the passenger's skin and the heating surface of a heating panel, in which the method takes into account said at least one item of time information ($t_c$) for determining the maximum temperature tolerated by the passenger.

The contact time between the passenger's skin and the heating surface can be measured using a radar or any other suitable device.

It is possible to arbitrarily set the contact time between the passenger's skin and the heating surface; $t_c$ is set to one second, in particular when no measuring device is available or in working order. According to the literature, it is customary to consider that the critical time for a person to withdraw their hand is of the order of one second.

According to one aspect of the invention, said method further comprises a step of correcting the dry bulb temperature that consists of applying a correction coefficient to said dry bulb temperature and makes it possible to obtain a corrected dry bulb temperature, known as the maximum permissible temperature of the heating surface.

According to one aspect of the invention, the correction coefficient decreases when the temperature of the heating surface on contact with the skin of a passenger is close to a critical temperature, and the correction coefficient is zero when the temperature of said heating surface on said contact is greater than a critical temperature.

According to one aspect of the invention, the critical temperature is between 70° C. and 80° C.

According to another aspect of the invention, the critical temperature is set at 80° C.

According to one aspect of the invention, said method further comprises a step of determining the maximum power output of the heating panel as a function of the maximum permissible temperature of the heating surface of said heating panel. Preferably, the power output of the heating panel is less than said maximum power.

According to one aspect of the invention, the method further comprises a step of acquiring at least one item of data representative of the thermal environment around the heating panel, in which the method takes into account said item of data representative of the thermal environment for determining the power output of the heating panel.

According to one aspect of the invention, the item of data representative of the thermal environment around the heating panel is the outside temperature and/or the temperature inside the passenger compartment.

According to one aspect of the invention, the passenger compartment of the vehicle comprises at least one sensor arranged to measure a parameter used to determine at least one of the items of data representative of the thermal environment around the heating panel. The sensor is selected from:
- a DMS camera to identify or characterize the passengers, in particular the driver,
- an infrared camera installed so that it observes the radiating surface in the dome, for example on or near the ceiling light,
- a local temperature sensor,
- a numerical evaluation of the contact temperature produced by a thermal calculation incorporating data representative of the environment and the electric power of the panels,
- a temperature sensor measuring the temperature of the air near the panel.

According to one aspect of the invention, the method further comprises a step of acquiring at least one item of spatial information relating to the passenger inside the passenger compartment, and said method takes into account said at least one item of spatial information for determining the parts of the passenger's body likely to touch a heating surface of a heating panel.

According to one aspect of the invention, the spatial information is acquired by means of an infrared dome formed by a wide-angle infrared camera placed on a ceiling of the passenger compartment.

The invention also relates to a device for controlling the temperature of a heating surface of a heating panel suitable for being installed inside a passenger compartment of a vehicle, for example a motor vehicle, this surface being likely to be touched by a passenger in said passenger compartment, the device comprising:
- a processing unit arranged to control the temperature of said heating surface as a function of at least one item of data representative of the profile of a passenger accommodated in the passenger compartment and/or at least one item of data representative of the heating surface of the heating panel.

This data can be determined by at least one sensor including:
- a camera, in particular a DMS camera, arranged to observe at least one passenger in the passenger compartment,
- an infrared dome formed by a wide-angle infrared camera placed on a ceiling of the passenger compartment,
- a physiological sensor,
- a sensor detecting the temperature prevailing in the passenger compartment.

Figure 2:
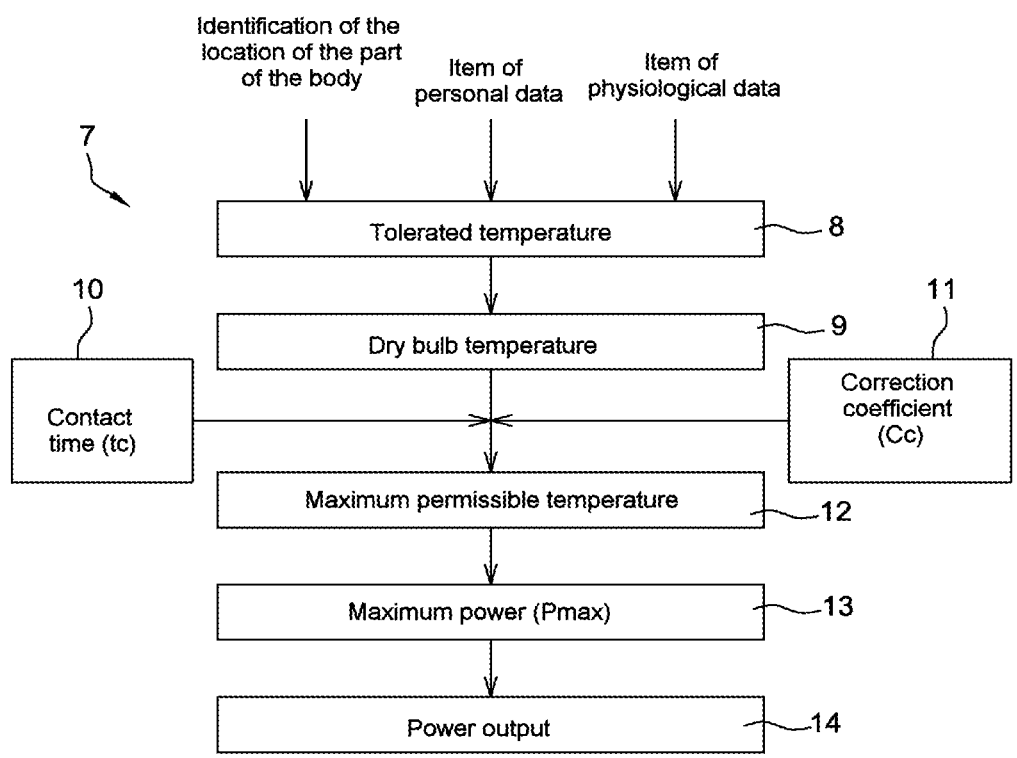
Figure 3:
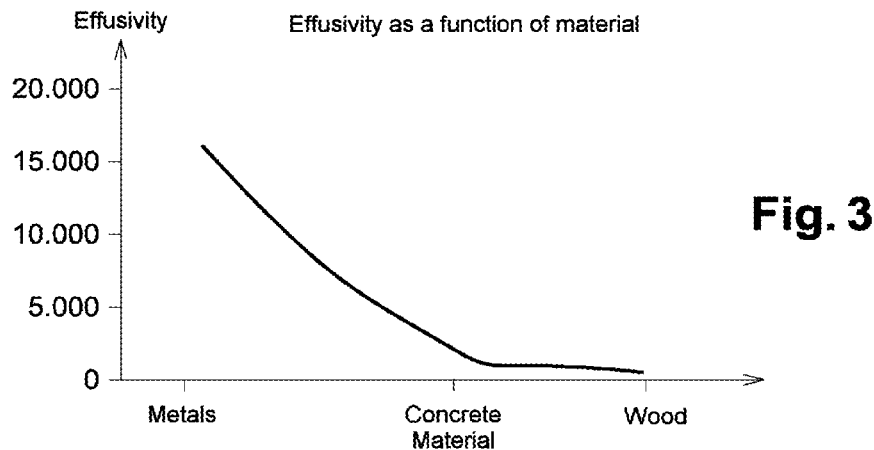
Figure 4:
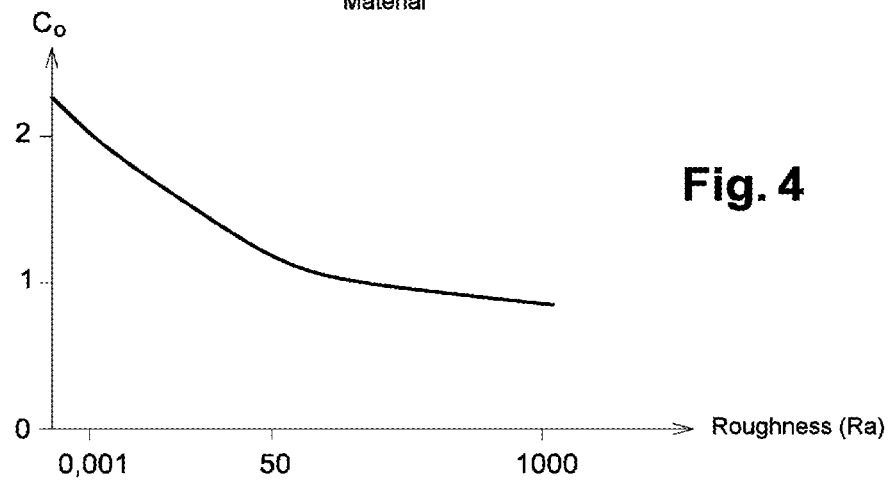
Figure 5:
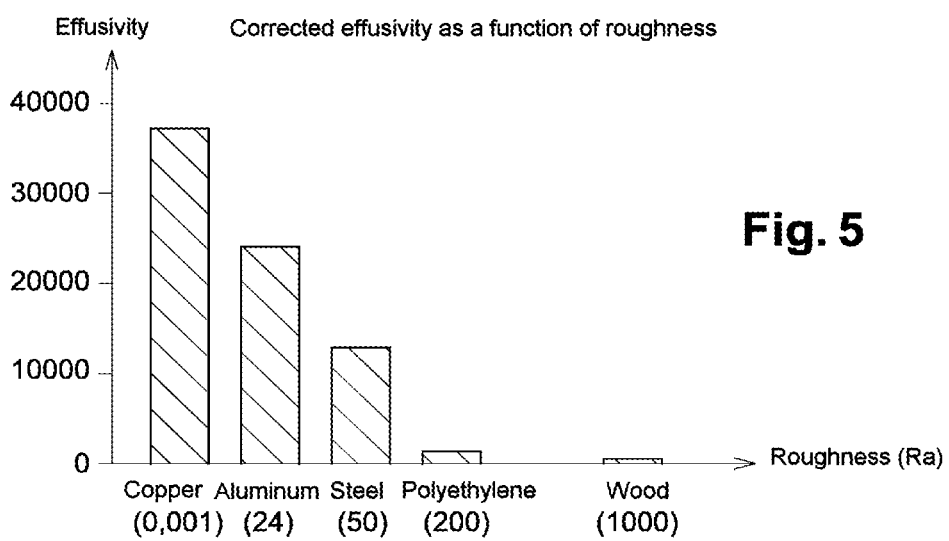
Figure 6:
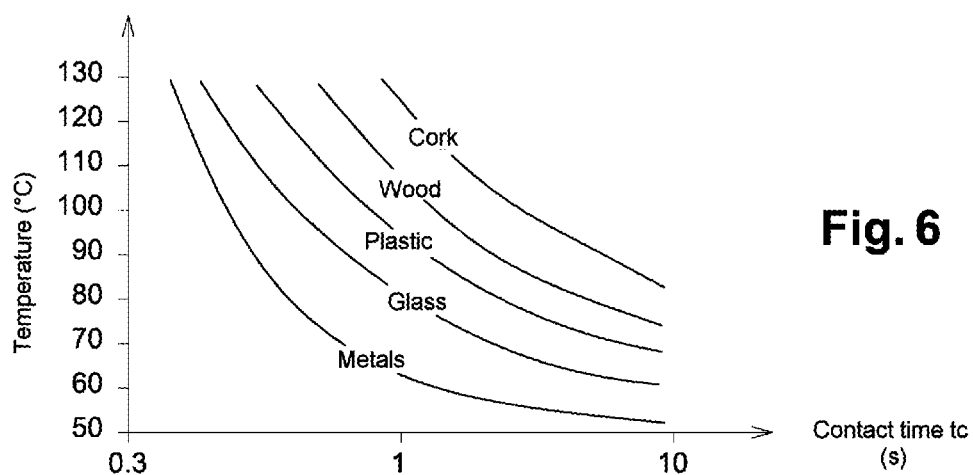
Figure 7:
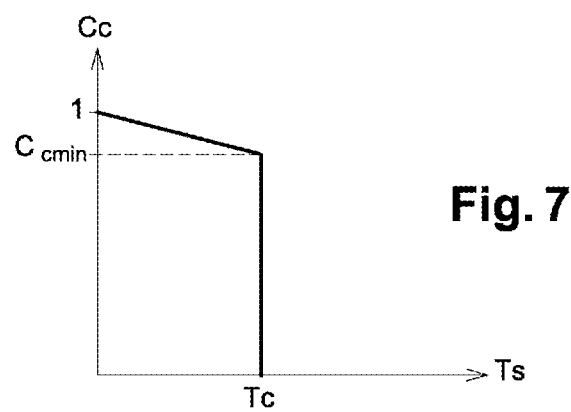
Figure 8:
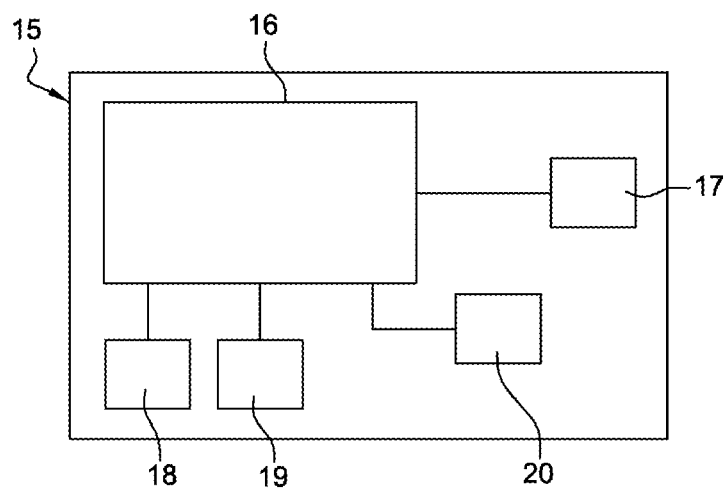

Further features, details and advantages of the invention will become more clearly apparent from reading the following description, given by way of non-limiting illustrative examples, and from the attached drawings, in which:

FIG. 1 is a transverse cross-sectional view of a heating panel suitable for being installed inside a vehicle passenger compartment, FIG. 2 illustrates the steps of the method for controlling the temperature of heating surface of a heating panel according to FIG. 1, FIG. 3 is a curve showing the effusivity of the material of the heating surface as a function of the type of constituent material, for a contact time equal to one second, FIG. 4 is a curve showing a correction factor Co as a function of the roughness, FIG. 5 is a diagram showing the corrected effusivity (by applying a correction factor Co to the effusivity depending on the material) of various materials as a function of their roughness and mechanical characteristic, FIG. 6 is a curve showing the maximum permissible temperature for the heating surface as a function of the contact time ($t_c$), FIG. 7 is a curve showing the correction coefficient $C_c$ as a function of the temperature of the heating surface ($T_s$), FIG. 8 schematically and partially illustrates a device for controlling the temperature of the heating surface according to the invention.

In the description below, the terms user, driver and passenger will be used interchangeably in order to characterize an individual situated in the passenger compartment of a motor vehicle and likely to touch the heating surface of a heating panel.

The invention relates to a method for controlling the temperature of a heating surface of a heating panel suitable for being installed inside a passenger compartment of a vehicle, for example a motor vehicle. FIG. 1 shows a model of heating panel 1 that can be incorporated into a vehicle passenger compartment. The heating panel 1 can be arranged in a particular zone of the passenger compartment, for example the dashboard, a seat, a roof, a pillar, a footwell, etc.

According to one particular embodiment, the heating panel 1 comprises an assembly of several layers rigidly connected to each other. Preferably, these layers are three in number. A distinction is made between the radiation-generating layer 2, the thermally insulating layer 3 and the layer 4 protecting the layer 2.

The radiation-generating layer 2 is arranged to generate heat capable of warming at least one user of the vehicle. This layer comprises at least one heating element and at least two electrodes configured to supply the heating element with electricity. The heating element will then emit heat by the Joule effect, and where appropriate emit infrared radiation, the radiative component of heating.

The layer 3 is arranged in contact with the layer 2. Due to its thermally insulating character, it limits the heat losses to zones that are not useful to the heating of the passenger compartment of the vehicle.

The layer 4 is arranged on the passenger compartment side, more particularly towards a passenger. It performs a function of both protecting and trimming the layer 2 and enables the aesthetic incorporation of the heating panel 1 into the passenger compartment of the vehicle. The layer 4 can therefore be characterized as a decorative layer of the heating panel. The layer 4 thus comprises a material that is selected according to aesthetics and design criteria. Such a material is in particular selected from: leather, wood, fabric, paint, lacquer, metal, plastic or any other material enabling the aesthetic anchoring of the heating panel in the passenger compartment. Ideally, the layer 4 is characterized by significant emissivity, so that it does not obstruct the infrared waves emitted by the heating panel.

The outer face 5 of the layer 4 is the face directed towards at least one of the passengers. More specifically, the outer face is the face of the layer 4 on the opposite side to the inner face of the layer 4, this inner face being the face in contact between the layer 2 and the layer 4. The outer face 5 is therefore a visible part of the heating panel 1 inside the passenger compartment. When the heating panel is operating, the outer face 5 heats up and reaches a certain temperature. The outer face 5 will therefore be referred to interchangeably hereinafter as the heating surface 5 of the heating panel 1. The temperature measured on the surface of the heating panel (i.e. on the outer face 5) is referred to as the heating surface temperature. One of the passengers is likely to touch the heating surface 5. The part of the passenger's body that comes into contact with the heating surface can be for example their hand 6, and more generally any other element in direct proximity to the heating surface of the heating panel (any part of the passenger's body, clothing, etc.).

The heating panel 1 described herein comprises three layers, but other embodiments can be envisaged. It is thus realistic to incorporate other sub-layers into the layers set out above (for example, thermal and electric insulation and retention sub-layers). The way in which the three layers of the heating panel are arranged is not therefore under any circumstances a limiting criterion of the present invention.

With reference to FIG. 2, the method 7 for controlling the temperature of a heating surface of a heating panel includes different steps described below.

The method 7 for controlling the temperature of a heating surface comprises a step of determining the maximum temperature tolerated $T_{tolerated}$ (box 8, FIG. 2) by a passenger in the vehicle, said maximum tolerated temperature $T_{tolerated}$ being determined on the basis of at least one item of data representative of the profile of said passenger.

An item of data representative of the profile of a passenger accommodated in the passenger compartment can be selected from:
- a physiological characteristic of the passenger: for example their metabolic activity, age, sex, weight, or skin color.
- a state of health of the passenger. For example, a dehydrated person is less tolerant to heat than a person with a satisfactory hydration level.
- an item of information about the passenger's lifestyle: their occupational category, a hobby, or their country of origin. In this regard, a person accustomed to very low temperatures (for example a person living in a Scandinavian country) is less tolerant to heat than a person living in a hot country. In addition, a chef accustomed to working next to heat sources tolerates higher temperatures than the average individual.
- the sensitivity of a part of the body likely to come into contact with the heating surface, in particular the sensitivity of a hand, arm and/or foot.

The passenger compartment of the vehicle comprises at least one sensor arranged to measure a parameter used to determine at least one of the items of data described above.

The sensor is selected from:
- a DMS camera,
- an infrared camera installed so that it observes the radiating surface in the dome, for example on or near the ceiling light,
- a local temperature sensor,
- a numerical evaluation of the contact temperature produced by a thermal calculation incorporating data representative of the environment and the electric power of the panels,
- a temperature sensor measuring the temperature of the air near the heating panel.

A DMS (Driver Monitoring System) camera is a camera that operates in the near infrared. By means of algorithms, it is possible to deduce a number of items of information, such as: recognizing the identity of the passenger, estimating their heart rate, etc.

The tolerated temperature depends on the sensitivity of the individual to heat; it is a complex function that depends in particular on age, the part of the body in question, the occupation and the level of fatigue of the individual.

For a contact time of the order of one second with the heating surface, the tolerated temperature is close to 60° C.

For a contact time of the order of 10 seconds, the tolerated temperature is close to 52° C.

The heat tolerance can vary with the occupation of the individual in question. It has been observed that a chef tolerates higher temperatures, up to 70° C. for one second of contact with the heating surface.

The method for controlling the temperature of a heating surface advantageously comprises a step of determining the dry bulb temperature $T_{dry}$ of the heating surface (box 9, FIG. 2). $T_{dry}$ is calculated in particular on the basis of the maximum temperature tolerated $T_{tolerated}$ by the passenger and at least one item of data representative of the heating surface.

According to a preferred embodiment, the data representative of the heating surface of the heating panel is the effusivity $\varepsilon_{mat}$ of its constituent material. The heating surface can be made from: leather, wood, fabric, paint, lacquer, metal, plastic, or any other material enabling the aesthetic anchoring of the heating panel in the passenger compartment.

FIG. 3 shows the effusivity $\varepsilon_{mat}$ (unit: $J \cdot m^{-2} \cdot K^{-1} \cdot s^{-1/2}$) of various materials. It will be noted that metals have high effusivity compared to concrete and wood.

EXAMPLE 1: THE HEATING SURFACE IS MADE FROM STEEL

Steel has an average effusivity $\varepsilon_{steel}=14{,}000$ $J \cdot m^{-2} \cdot K^{-1} \cdot s^{-1/2}$ Skin has an average effusivity $\varepsilon_{skin}=400$ $J \cdot m^{-2} \cdot K^{-1} \cdot s^{-1/2}$ and its average temperature is $T_{skin}=37°$ C.

A passenger, identified by a sensor of the system as tolerating a maximum temperature $T_{tolerated}=50°$ C., is likely to touch the steel heating surface 5 of a heating panel 1 with their hand 6. The dry bulb temperature $T_{dry}$ of the heating surface 5 determined by the control method (boxes 8 and 9, FIG. 2) is linked to the maximum tolerated temperature by the following formula:

$$T_{tolerated} = \frac{\varepsilon_{steel} \times T_{dry} + \varepsilon_{skin} \times T_{skin}}{\varepsilon_{steel} + \varepsilon_{skin}}$$

$$T_{dry} = \frac{T_{tolerated} \times (\varepsilon_{steel} + \varepsilon_{skin}) - \varepsilon_{skin} \times T_{skin}}{\varepsilon_{acier}}$$

$$T_{dry} = \frac{50 \times (14000 + 400) - 400 \times 37}{14000}$$

$$T_{dry} = 50° \text{ C.}$$

In conclusion, the dry bulb temperature of the steel heating surface determined on the basis of the effusivity of steel and the maximum temperature tolerated by this passenger is approximately 50° C.

EXAMPLE 2: THE HEATING SURFACE IS MADE FROM WOOD

Wood has an average effusivity $\varepsilon_{wood}=500$ $J \cdot m^{-2} \cdot K^{-1} \cdot s^{-1/2}$ Skin has an average effusivity $\varepsilon_{skin}=400$ $J \cdot m^{-2} \cdot K^{-1} \cdot s^{-1/2}$ and its temperature is approximately $T_{skin}=37°$ C.

A passenger, identified by a sensor of the system as tolerating a maximum temperature $T_{tolerated}=50°$ C., is likely to touch the wooden heating surface 5 of a heating panel 1 with their hand 6. The dry bulb temperature $T_{dry}$ of the heating surface 5 determined by the control method (blocks 8 and 9, FIG. 2) is linked to the maximum tolerated temperature by the following formula:

$$T_{tolerated} = \frac{\varepsilon_{wood} \times T_{dry} + \varepsilon_{skin} \times T_{skin}}{\varepsilon_{wood} + \varepsilon_{skin}}$$

$$T_{dry} = \frac{T_{tolerated} \times (\varepsilon_{wood} + \varepsilon_{skin}) - \varepsilon_{skin} \times T_{skin}}{\varepsilon_{wood}}$$

$$T_{dry} = \frac{50 \times (500 + 400) - 400 \times 37}{500}$$

$$T_{dry} = 60° \text{ C.}$$

In conclusion, the dry bulb temperature of the wooden heating surface determined on the basis of the effusivity of wood and the maximum temperature tolerated by this passenger is approximately 60° C.

According to a preferred embodiment, the item of data representing the heating surface of the heating panel is the effusivity $\varepsilon_{corrected}$ of the material, $\varepsilon_{corrected}$ being the effusivity of the material corrected by a factor or coefficient taking into account the surface finish of this material, in particular its roughness. FIG. 4 shows the change in the factor Co as a function of the roughness Ra of various materials. The roughness $R_a$ (average roughness) is intrinsically linked to the nature and production method of the constituent material. Roughness can be defined as all of the irregularities on the surface of the material, in particular asperities and hollows. It is known to a person skilled in the art that roughness can be evaluated according to two approaches: by performing a roughness test (visual and/or tactile comparison of the surface of a material with a set of reference samples), or using a roughness meter (stylus probe, focus variation microscope, confocal microscopy, or atomic force microscopy (AFM)).

FIG. 5 shows the change in effusivity $\varepsilon_{corrected}$ as a function of the roughness ($R_a$) of various metals (copper, aluminum, steel, polyethylene, wood). The effusivity $\varepsilon_{corrected}$ increases with the roughness of the material forming the heating surface. The dry bulb temperature that can be applied to the heating surface is thus greater the rougher the material forming the heating surface.

According to a preferred embodiment, the method 7 for controlling the temperature of the heating surface further comprises a step (box 10, FIG. 2) of acquiring at least one item of time information ($t_c$) relating to the contact duration or time between the passenger's skin and the heating surface of the heating panel. The method takes into account this item of time information for determining the maximum temperature tolerated by the passenger. The time $t_c$ can be measured using a radar or any other appropriate device. FIG. 6 contains superimposed curves, each showing the maximum permissible temperature for the heating surface as a function of the contact time $t_c$, for various constituent materials of the heating surface.

According to FIG. 6, the longer the contact time between the skin and the heating surface, the lower the maximum temperature tolerated by the passenger, regardless of the type of material forming the heating surface.

Taking the contact time $t_c$ into account makes it possible to propose an even more efficient model for controlling the temperature of the heating surface of the heating panel.

If no measuring device is provided, the contact time $t_c$ is set to one second, the critical time for an individual to withdraw their hand on unintentional contact with the heating surface.

According to a preferred embodiment, the method 7 for controlling the temperature of the heating surface further comprises a step (box 11, FIG. 2) of correcting the dry bulb temperature, consisting of applying a correction coefficient $C_c$ thereto. The corrected dry bulb temperature ($T_{dry}$, corrected) is then determined. This is the maximum permissible temperature of the heating surface of the heating panel. $C_c$ depends on the temperature of the heating surface. FIG. 7 is an example of the change in the correction coefficient applied as a function of the temperature of the heating surface $T_s$. $C_c$ decreases when $T_s$ is close to an arbitrarily defined critical temperature $T_c$ ($T_c$ can be a fixed value or a temperature range). By way of non-limiting illustrative examples, $T_c=80°$ C. or $T_c=[70°$ C.-80° C.]. While $T_s$ remains less than $T_c$, $C_c$ is between 1 and $C_{min}=0.9$. When $T_s$ exceeds $T_c$, $C_c$ is zero.

The correction coefficient $C_c$ is thus applied as a safety measure and makes it possible to overcome the risks of system failure.

Once any of the steps relating to each box 9, 10 or 11 has been carried out (the steps relating to boxes 10 and 11 being optional steps), a maximum permissible temperature $T_{max}$ of the heating surface can finally be determined (box 12, FIG. 2).

It will be noted that the order of at least some steps of the method can be reversed.

In addition, the method for controlling the temperature of a heating surface can comprise a step (box 13, FIG. 2) of determining the maximum power $P_{max}$ output of the heating panel as a function of the permissible temperature $T_{max}$ of the heating surface of this heating panel. Advantageously, the power output P(t) of the heating panel is less than $P_{max}$. The method takes into account at least one item of data representative of the thermal environment around the heating panel (temperature inside the passenger compartment, outside temperature, etc.) for determining P(t) (box 14, FIG. 2).

The method can further comprise a step of acquiring at least one item of spatial information relating to the passenger inside the passenger compartment. The method takes into account said at least one item of spatial information for determining the parts of the passenger's body (hand, feet, arms, etc.) likely to touch a heating surface of a heating panel. The information can be acquired by means of an infrared dome formed by a wide-angle infrared camera placed on a ceiling of the passenger compartment. It is thus possible to identify the location of the heating surface likely to be touched by part of the passenger's body, and control the temperature of this heating surface in particular.

FIG. 8 shows a device 15 for controlling the temperature of a heating surface of a heating panel 1. This device comprises a data processing unit 16 arranged to control the temperature of the heating surface as a function of at least one item of data representative of the profile of a passenger accommodated in the passenger compartment and/or at least one item of data representative of the heating surface of the heating panel. This data can be determined by at least one sensor including:
- a camera, in particular a DMS camera 17, arranged to observe at least one passenger in the passenger compartment,
- an infrared dome 18 formed by a wide-angle infrared camera placed on a ceiling of the passenger compartment,
- a physiological sensor 19,
- a sensor 20 detecting the temperature prevailing in the passenger compartment.

In conclusion, the invention makes it possible to minimize or even eliminate the risk of burning a passenger likely to come into contact with the heating surface of a heating panel. The invention therefore makes it possible to meet growing needs relating to safety inside the vehicle. One of the advantages of the present invention is that it offers a personalized driving experience as the temperature control method takes into account at least one item of data representative of the passenger's profile and/or at least one item of data relating to the heating surface of the heating panel.

The invention claimed is:

1. A method for controlling a temperature of a heating surface of a heating panel being installed inside a passenger compartment of a motor vehicle, the surface being likely to be touched by a passenger in the passenger compartment, the method comprising:
    controlling the temperature of the heating surface as a function of at least one item of data representative of the profile of the passenger accommodated in the passenger compartment or at least one item of data representative of the heating surface of the heating panel; and
    calculating a dry bulb temperature of the heating surface, as a maximum permissible temperature of the heating surface,
    wherein the dry bulb temperature is calculated based on a determined maximum temperature tolerated by the passenger and on the at least one item of data representative of the heating surface,
    the item of data representative of the heating surface of the heating panel being an effusivity of material forming the heating surface, and
    the effusivity of the material being corrected by a factor taking into account a surface finish of the material, the factor being selected from: roughness, porosity, irregularity, and continuity.

2. The method as claimed in claim 1, the data representative of the profile of the passenger being at least one characteristic selected from:
    a physiological characteristic,
    a state of health,
    an item of lifestyle information, and
    sensitivity of a part of the body likely to come into contact with the heating surface.

3. The method as claimed in claim 1, further comprising: determining the maximum temperature tolerated by the passenger in the vehicle, based on the at least one item of data representative of the profile of the passenger.

4. The method as claimed in claim 1, further comprising: acquiring at least one item of time information relating to a contact time between skin of the passenger and the heating surface of a heating panel, in which the method takes into account the at least one item of time information for determining the maximum temperature tolerated by the passenger.

5. The method as claimed in claim 1, further comprising: correcting the dry bulb temperature via applying a correction coefficient to the dry bulb temperature to obtain a corrected dry bulb temperature.

6. The method as claimed in claim 5, the correction coefficient decreasing when the temperature of the heating surface on contact with a skin of the passenger is close to a critical temperature, and the correction coefficient being zero when the temperature of the heating surface on contact with the skin is greater than a critical temperature.

7. The method as claimed in claim 1, further comprising: acquiring at least one item of spatial information relating to the passenger inside the passenger compartment, in which the method takes into account the at least one item of spatial information for determining body parts of the passenger likely to touch the heating surface of the heating panel.

8. A method for controlling a temperature of a heating surface of a heating panel being installed inside a passenger compartment of a motor vehicle, the surface being likely to be touched by a passenger in the passenger compartment, the method comprising:
- controlling the temperature of the heating surface as a function of at least one item of data representative of the profile of the passenger accommodated in the passenger compartment or at least one item of data representative of the heating surface of the heating panel;
- calculating a dry bulb temperature of the heating surface, as a maximum permissible temperature of the heating surface,
- wherein the dry bulb temperature is calculated based on a determined maximum temperature tolerated by the passenger and on the at least one item of data representative of the heating surface; and
- correcting the dry bulb temperature via applying a correction coefficient to the dry bulb temperature to obtain a corrected dry bulb temperature.

9. The method as claimed in claim 8, the correction coefficient decreasing when the temperature of the heating surface on contact with a skin of the passenger is close to a critical temperature, and the correction coefficient being zero when the temperature of the heating surface on contact with the skin is greater than a critical temperature.

* * * * *